US012556562B2

(12) United States Patent
Caine et al.

(10) Patent No.: US 12,556,562 B2
(45) Date of Patent: Feb. 17, 2026

(54) DEDUPLICATION OF ENDPOINT CONNECTIONS

(71) Applicant: Sophos Limited, Abingdon (GB)

(72) Inventors: Jonathan Francis Caine, Abingdon (GB); Ryan Elliot Mills, East Yorkshire (GB); Mohamed Khalid Mahmoud Abdalla Dewidar, Oxfordshire (GB); Timothy Rayment, Abingdon (GB); Mangal Rakesh Vankadaru, Buckinghamshire (GB)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 18/617,404

(22) Filed: Mar. 26, 2024

(65) Prior Publication Data

US 2025/0310361 A1    Oct. 2, 2025

(51) Int. Cl.
*H04L 9/40* (2022.01)

(52) U.S. Cl.
CPC ...... *H04L 63/1425* (2013.01); *H04L 63/0876* (2013.01); *H04L 63/108* (2013.01)

(58) Field of Classification Search
CPC .............. H04L 63/1425; H04L 63/0876; H04L 63/108
See application file for complete search history.

(56) References Cited

U.S. PATENT DOCUMENTS

| 6,987,726 | B1 | 1/2006 | Elliott |
| 7,554,924 | B1 | 6/2009 | Shapiro et al. |
| 9,494,193 | B2 | 11/2016 | Wada |
| 9,495,193 | B2 | 11/2016 | Doherty et al. |
| 9,602,556 | B1 * | 3/2017 | Cham .................. H04L 67/565 |
| 11,882,538 | B1 * | 1/2024 | Bertz .................... H04W 60/04 |
| 12,021,904 | B1 * | 6/2024 | Corona ............... H04L 65/1016 |
| 2007/0248077 | A1 * | 10/2007 | Mahle, Jr. ............. H04M 3/382 370/352 |
| 2010/0240369 | A1 * | 9/2010 | Law .................... H04W 36/302 455/436 |
| 2012/0213084 | A1 * | 8/2012 | Belmont ............. H04L 63/1466 370/241 |
| 2014/0122672 | A1 | 5/2014 | Chen et al. |
| 2014/0297597 | A1 | 10/2014 | Matsubara et al. |
| 2016/0248676 | A1 * | 8/2016 | Thanasekaran ....... G06F 3/0613 |
| 2019/0036926 | A1 * | 1/2019 | Isola ................... H04L 63/1425 |

(Continued)

OTHER PUBLICATIONS

Sebestyen et al., "Assessing the Stability of Time-Division Multiple Access (TDMA) Mesh Networks through Flooding Route Selection," 2023 IEEE 21st Jubilee International Symposium on Intelligent Systems and Informatics (SISY) Year: 2023 | Conference Paper | Publisher: IEEE.*

(Continued)

*Primary Examiner* — Roderick Tolentino
(74) *Attorney, Agent, or Firm* — Strategic Patents, P.C.

(57) ABSTRACT

In an enterprise network with a threat management facility that manages individual endpoints based on unique endpoint identifiers, each new compute instance connecting to the threat management facility (or other management resource) is compared to existing records. The threat management facility can then detect and remediate compute instances having duplicate identifiers in the enterprise network, for example by using a challenge-response protocol to uniquely identify each of the compute instances.

20 Claims, 5 Drawing Sheets

(56) References Cited

U.S. PATENT DOCUMENTS

| | | | |
|---|---|---|---|
| 2019/0253462 A1* | 8/2019 | Reiman | H04L 65/1104 |
| 2019/0297147 A1 | 9/2019 | Drasin et al. | |
| 2020/0204991 A1* | 6/2020 | Parry | G06F 11/3037 |
| 2020/0244695 A1 | 7/2020 | Veselov et al. | |
| 2020/0374121 A1 | 11/2020 | Momchilov et al. | |
| 2020/0412556 A1* | 12/2020 | Yoon | H04L 63/0876 |
| 2022/0141178 A1 | 5/2022 | Suzuki | |
| 2023/0333869 A1 | 10/2023 | Zoller, IV et al. | |
| 2023/0412641 A1 | 12/2023 | Watkiss et al. | |
| 2025/0063450 A1* | 2/2025 | Huang | H04W 28/0289 |

OTHER PUBLICATIONS

Li et al., "Research on Topology Identification of Distribution Network Under the Background of Big Data," 2020 IEEE 4th Conference on Energy Internet and Energy System Integration (EI2) Year: 2020 | Conference Paper | Publisher: IEEE.*

USPTO, , "U.S. Appl. No. 17/748,008 Notice of Allowance mailed Mar. 19, 2025", , 13 pages.

ISA/EP, , "PCT Application No. PCT/EP2025/056269 International Search Report and Written Opinion mailed Apr. 4, 2025", , 13 pages.

\* cited by examiner

DEDUPLICATION OF ENDPOINT CONNECTIONS

RELATED APPLICATIONS

This application is related to U.S. patent application Ser. No. 17/748,008 filed on May 18, 2022, the entire content of which is hereby incorporated by reference.

BACKGROUND

In general, endpoint identifiers may be used to uniquely identify endpoints in a managed network. However, when virtual or physical endpoints use a copy of endpoint device configuration data, or when they are virtually deployed from a common image or the like, these endpoints may use the same endpoint identifier. This can happen, for example, if customers create a copy of an endpoint device, or deploy multiple devices from a single image using VDI management software or golden image processes. Connections of endpoints may also be transient due to a range of causes including typical business cycles (e.g., users (re)connecting to a network at the start of each workday), network disturbances that cause endpoint disconnection, and the like. This transient behavior, combined with multiple deployments with a single identifier, can make it difficult or impossible to manage individual devices based on device identifiers.

There remains a need for a computer security platform that can detect and rectify the use of a single endpoint identifier by multiple endpoints.

SUMMARY

In an enterprise network with a threat management facility that manages individual endpoints based on unique endpoint identifiers, each new compute instance connecting to the threat management facility (or other management resource) is compared to existing records. The threat management facility can then detect and remediate compute instances having duplicate identifiers in the enterprise network, for example by using a challenge-response protocol to uniquely identify each of the compute instances.

In one aspect, a method for detecting and remediating duplicate endpoint identifiers disclosed herein includes detecting a first connection to a threat management facility for an enterprise network, the first connection including an endpoint identifier; determining that the endpoint identifier is associated with a plurality of connections to the threat management facility including at least the first connection and a second connection; transmitting an identification challenge over each of the plurality of connections associated with the endpoint identifier; in response to receiving two or more different challenge responses, transmitting a command over a corresponding connection for each of the two or more different challenge responses to increase a frequency of command polls to the threat management facility; in response to a command poll received over one of the plurality of connections, requesting an endpoint associated with the one of the plurality of connections to reregister to the threat management facility; and assigning a unique endpoint identifier to the one of the plurality of connections based on a corresponding one of the two or more different challenge responses.

The method may include, in response to receiving a subsequent connection including the endpoint identifier, orchestrating an endpoint re-registration process that causes configuration of an endpoint associated with the subsequent connection with a distinct endpoint identifier. Determining that the endpoint identifier is associated with a plurality of connections may be based on a directory that associates endpoint identifiers with connections to the threat management facility. In response to receiving two or more different challenge responses, the threat management facility may update one or more records in a directory of endpoint identifiers for the endpoint identifier that indicates the endpoint identifier is cloned. In response to receiving two or more different challenge responses, the threat management facility may remove records in a directory of endpoint identifiers that correspond to connections for which a response to the identification challenge was not received. Requesting the endpoint to reregister may be based on a reregistration throttling function of the threat management facility that limits reregistration based on a percentage of connections to the threat management facility. Requesting the endpoint to reregister may be based on a reregistration throttling function of the threat management facility that limits reregistration based on a percentage of connections that share an endpoint identifier. Transmitting the identification challenge is based on an identification challenge timeout. The identification challenge timeout may be an amount of time since a most recent prior identification challenge associated with the endpoint identifier. The identification challenge may include a challenge instance identifier. The challenge response may include the challenge instance identifier and a random string correlated to the challenge instance identifier.

The method may include transmitting a command to a plurality of computing resources in the enterprise network to treat each endpoint associated with the endpoint identifier as a cloned endpoint. The method may include, in response to receiving two or more different challenge responses, notifying a connection manager facility of the enterprise network that the endpoint identifier has been cloned. The method may include, in response to receiving two or more different challenge responses, configuring a connection manager of the enterprise network to notify the threat management facility in response to receiving a subsequent request for connection using the endpoint identifier.

In another aspect, a method for operating an endpoint disclosed herein includes connecting to a threat management facility of an enterprise network; receiving an identification challenge from the threat management facility; transmitting a challenge response to the identification challenge, the challenge response including a random string; receiving a command from the threat management facility to increase polling for commands from the threat management facility; in response to the command to increase polling, sending a poll for a command to the threat management facility; receiving a request to reregister with the threat management facility; and reregistering with the threat management facility as a unique endpoint based on the response to the identification challenge.

The method may include, in response to the command to increase polling for commands, adjusting a frequency of polling for commands from a default command polling frequency to a cloned endpoint command polling frequency. The method may include, in response to the identification challenge, randomly generating a challenge response string that is correlated to the identification challenge. The method may include, in response to the identification challenge, generating a random number and incorporating the random number and an identification challenge identifier of the received identification challenge in the challenge response.

In another aspect, a method disclosed herein includes detecting an indication of cloned use of an endpoint identifier at a threat management facility, the indication identifying a shared endpoint management channel; transmitting an endpoint identification challenge over the shared endpoint management channel associated with the cloned endpoint identifier; in response to receiving two or more different responses from cloned endpoints to the identification challenge, transmitting an instruction over the shared endpoint management channel causing each cloned endpoint to increase a frequency of command polls to the threat management facility; notifying a plurality of network management resources to manage endpoints using the endpoint identifier as cloned endpoints; and in response to receiving an increased frequency command poll from a cloned endpoint, assigning a unique endpoint identifier to the cloned endpoint. The method may include removing records in an endpoint directory associated with the cloned endpoint identifier for endpoints that did not respond to the endpoint identification challenge.

BRIEF DESCRIPTION OF THE FIGURES

The foregoing and other objects, features and advantages of the devices, systems, and methods described herein will be apparent from the following description of embodiments thereof, and as illustrated in the accompanying drawings. The drawings are not necessarily to scale, emphasis instead being placed upon illustrating the principles of the devices, systems, and methods described herein.

DESCRIPTION

Figure 1:
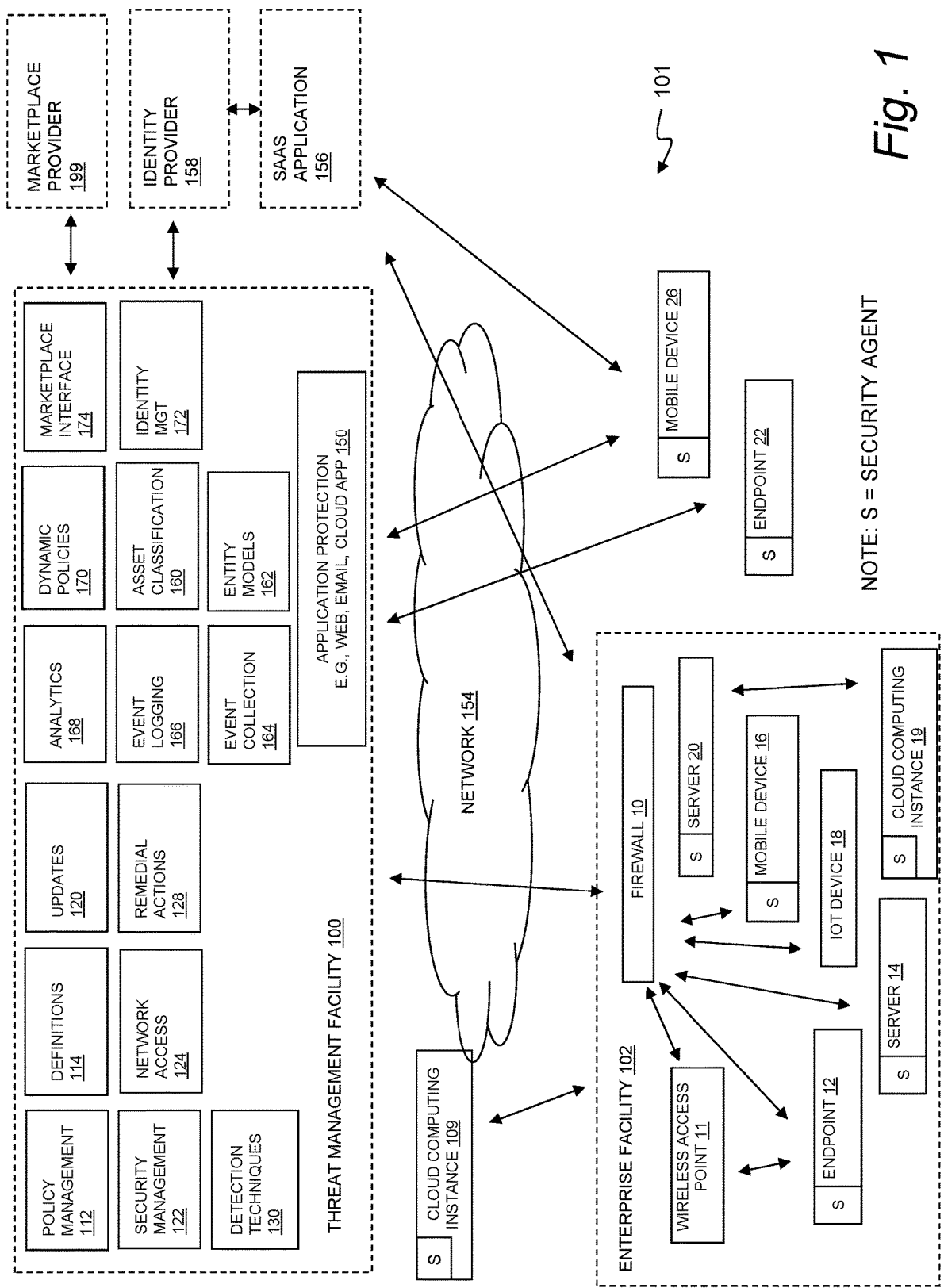
FIG. 1 depicts a block diagram of a threat management system, according to example embodiments.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular may be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, may be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification may be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network may be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IoT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection 150, asset classification facility 160, entity models 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It may be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the threat management facility 100, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management (e.g., as handled by a policy management facility 112) may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates (e.g., software patch, threat protection software, malware definition files) and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 may be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that is accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
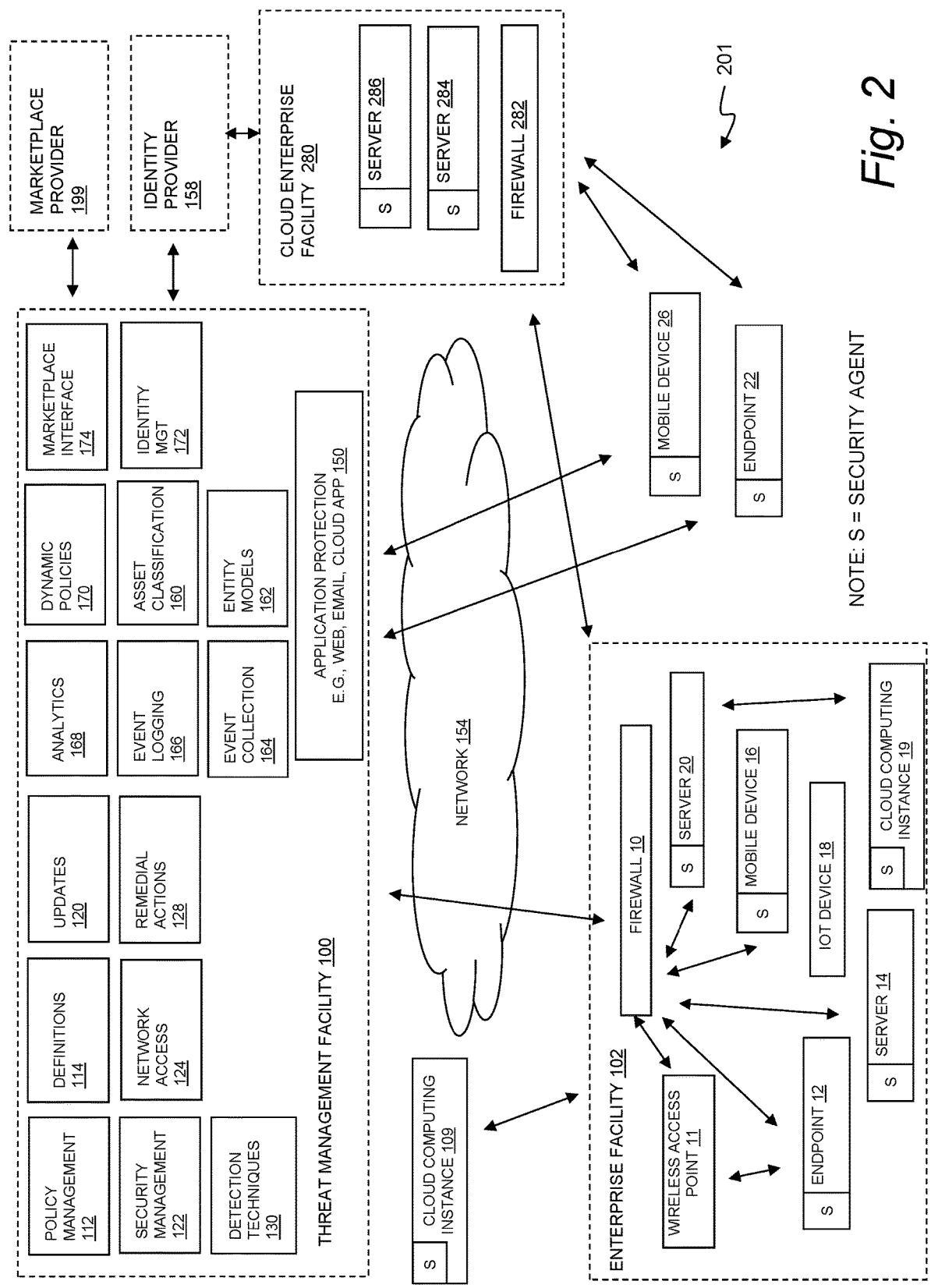
FIG. 2 depicts a block diagram of a threat management system, according to example embodiments.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It may be understood that there may be any number of servers 284, 286 and firewalls 282, as well as other compute instances in a given cloud enterprise facility 280. It also may be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

A threat management facility may be configured to determine that a plurality of endpoints using the same endpoint identifier have connected to an enterprise network or other network managed by the threat management facility, as generally described herein. The threat management facility may evaluate whether an endpoint identifier is cloned (e.g., being concurrently used by multiple endpoints/connections), and may determine how many endpoints/connections are using the cloned endpoint identifier. Based on one or more results of this evaluation, the threat management facility, and/or other network management resources, or combinations thereof, may initiate remedial action(s) for resolving this cloned endpoint identifier. In one aspect, this may include causing the affected endpoints to accelerate re-registration to the network so that they can promptly receive a new (and unique) endpoint identifier if they are still in use.

In one aspect, the threat management facility may manage connection information, such as endpoint identifiers that are currently in use in the network. When two or more endpoints have connected to the network using the same endpoint identifier, the endpoint identifier is flagged as a candidate for being a cloned endpoint identifier. Not every repeated use of an endpoint identifier indicates the use of a cloned endpoint identifier for multiple endpoints. For example, what appears as a duplicate use of an endpoint identifier may be a reconnection of a previously disconnected endpoint. In this case, repeated use of the endpoint identifier is due to a stale endpoint connection identifier record, rather than a cloned use of the endpoint identifier. To determine whether a particular endpoint identifier is being concurrently used by more than one endpoint, further information may be required. Therefore, cloned endpoint identifier detection and remediation techniques disclosed herein may include not only detecting multiple instances of the same endpoint identifier, e.g., in records maintained by the threat management facility, but evaluating whether multiple instances of the identifier are being used by different endpoints with concurrent network connections.

Figure 3:
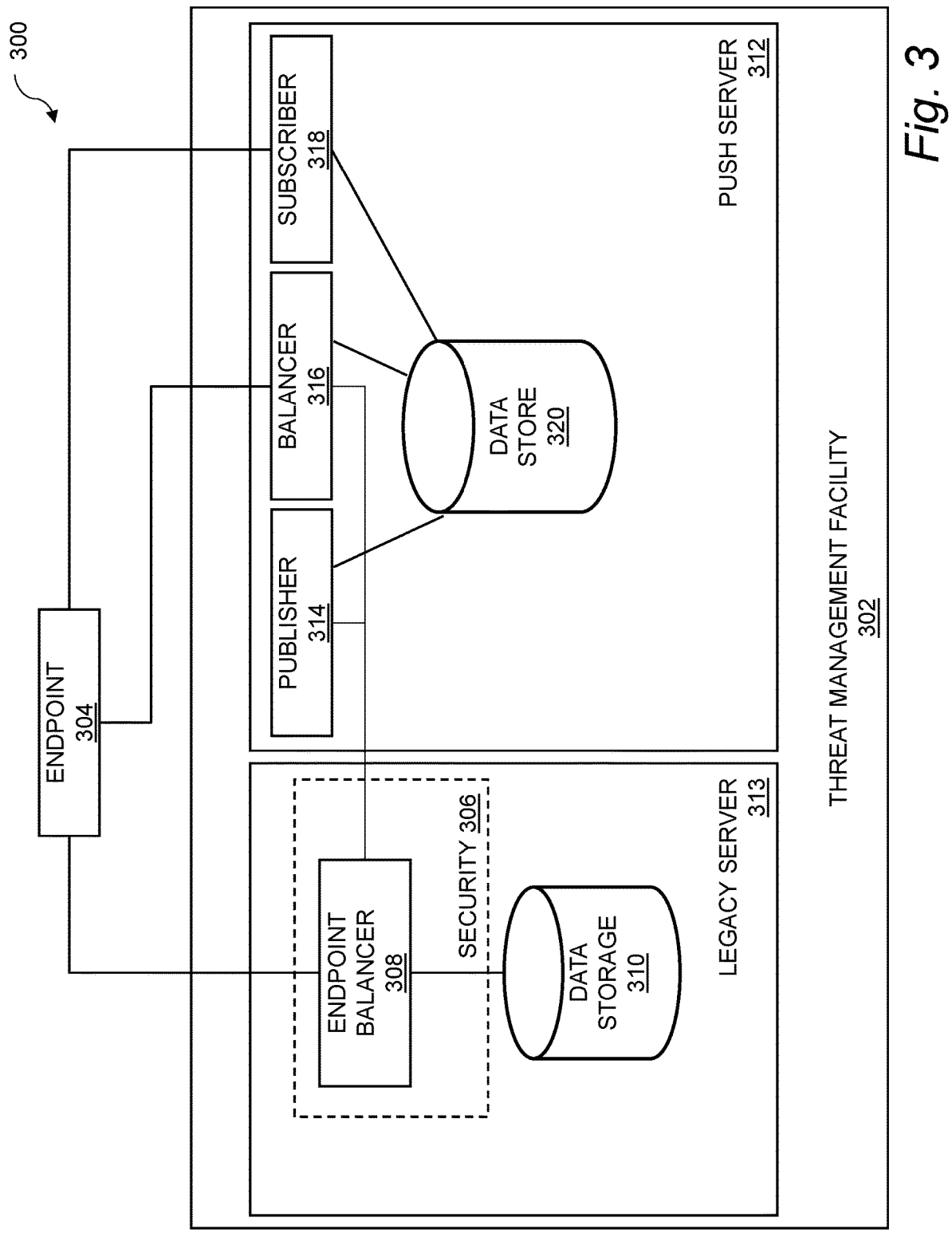
FIG. 3 illustrates a system for detecting and remediating duplicate endpoint identifiers.

FIG. 3 illustrates a system for detecting and remediating duplicate endpoint identifiers. The system 300 may include a threat management facility 302 such as any of the threat management facilities or other network management resources or facilities described herein. The threat management facility 302 may include a push server 312 having a plurality of resources including a publisher 314, a connection balancer 316, a subscriber 318, and a data store 320. The threat management facility 302 may also include an endpoint balancer 308 that couples a security resource 306, such as any of the resources or services provided by a threat management facility, to the endpoint 304, which may be any of the endpoints described herein. The security resource 306 may also include a data store 310.

The publisher 314 of the push server 312 may coordinate distribution of commands from a range of network resources, including other components of the threat management facility 302, to endpoints, such as the endpoint 304. The publisher 314 may store commands received from other network resources locally in the data store 320, along with information that determines the target recipients for these commands. The data store 320 may store this data in a manner accessible to other components of the threat management facility 302.

The connection balancer 316 of the push server 312 may provide a centralized connection point for connections by the push server 312. The connection balancer 316 may receive challenge responses from endpoints as described herein. The connection balancer 316 may also or instead improve performance of the push server 312 by managing distribution of traffic among subscriber endpoints, such as the endpoint 304.

The subscriber 318 of the push server 312 may maintain persistent Server-sent event (SSE) connections with endpoints such as the endpoint 304, enabling the endpoints to receive automatic updates from the push server 312, e.g., using an HTTP connection or the like. More generally, the subscriber 318 may maintain any suitable connection(s) with the endpoints and use any push technology or other communication protocol suitable for initiating data transmission to endpoints and sending message updates or data streams to the connected endpoints. These endpoint connections may be used, for example, to transmit a command notifying the endpoint that it is cloned, or initiating an identification challenge with the endpoint 304.

The data store 320 may store data and commands associated with and useful by the components of the push server 312. For example, the data store 320 may store data and commands useful for detecting duplicate endpoint identifiers and initiating remediations as described herein. The local data structure 320 may be configured as a fast-access cache in which at least transient endpoint-related data and commands are stored by one of the push server modules (e.g., the publisher 314) and retrieved by another push server module (e.g., the subscriber 318) for delivery to the endpoint 304.

The security resources 306 may provide threat management services for the threat management facility 302, and may be hosted on a legacy server 313. While a variety of architectures are possible, this general model (with separate connections to a push server 312 and a legacy server 313) permits the continued use of, e.g., legacy code for security services, such as a preexisting monolithic security application or the like, while using a scalable, containerized front end for managing persistent connections with endpoints. In this architecture, the push server 312 may be deployed as a microservice that opens and maintains persistent connections with endpoints, while the legacy server 313 provides a connection point for short-lived requests from endpoints (or more specifically, local security agents executing on endpoints) to the security resources 306 of the threat management facility 302. The security resources 306 may, for example, generally perform security-related communications and data processing, and provide security services and the like to the endpoint 304. The security resources 306 on the legacy server 313 may include an endpoint balancer 308 that provides a connection point for short-lived requests from endpoints, including the command poll described herein. The security resource may also include a data storage facility 310 for storing data related to the security resource 306. While the data store 320 for the push server 312 provides fast access, the data storage facility 310 for the security resources 306 may instead provide longer term, persistent storage of ground truth data concerning, e.g., whether endpoints are clones/duplicates of other endpoints in the enterprise network. While depicted as components of the threat management facility 302, it will be understood that one or more components of the system 300 (such as the push server 312) may be implemented as servers or other resources separate from, and coupled in a communicating relationship with, the threat management facility 302.

In general, the endpoint 304 may establish connections to the push server 312, which may include a connection to an endpoint-specific instance of the subscriber 318. The endpoint may also establish a connection to the security resource 306 for provisioning security services to the endpoint 304. This connection may include a connection to the endpoint balancer 308, which may more generally manage connections between the security resource 306 of the threat management facility and a number of endpoints in an enterprise network or the like. The endpoint balancer 308 may facilitate load balancing of endpoints, connections with endpoints, and threat management facility resources. The connection between the endpoint balancer 308 and the endpoint 304 may be used to communicate command polls, re-registration, and the like to the threat management facility 302, and more generally to support endpoint security management with the threat management facility 302. As illustrated in the figure, these connections may be separate from the connections to the push server 312, and may use different protocols, data formats, and the like as appropriate for the underlying data and command flows.

Figure 4:
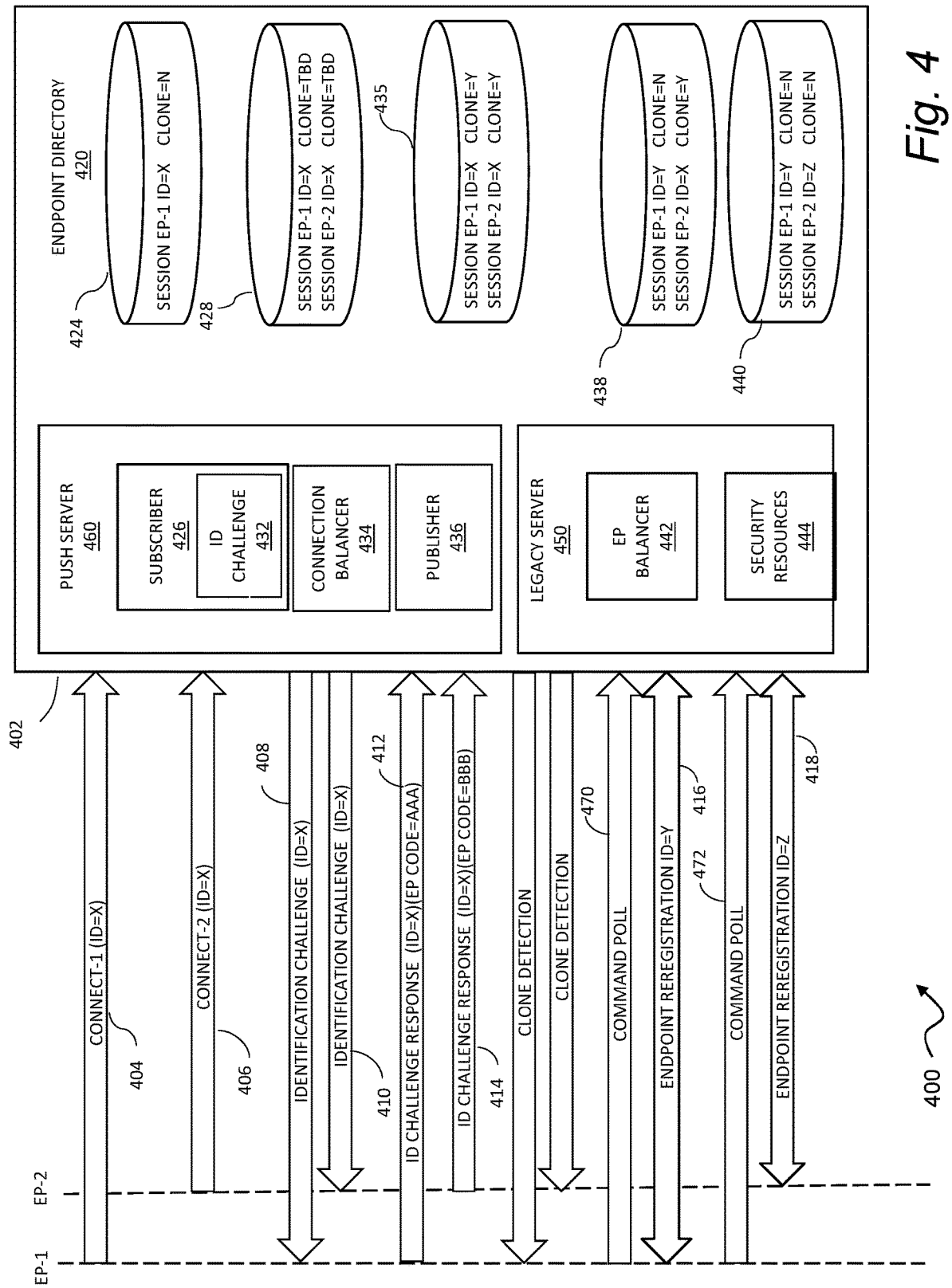
FIG. 4 illustrates a system for detecting and remediating duplicate endpoint identifiers.

FIG. 4 illustrates a system for detecting and remediating duplicate endpoint identifiers. The system 400 may include a threat management facility 402 such as any of the threat management facilities described herein. In general, the threat management facility 402 may include a legacy server 450 hosting an endpoint balancer 442 and security resources 444, such as any of the security services or resources described herein, along with a push server 460 hosting a subscriber module 426, a publisher 436, and a connection balancer 434 as described herein.

The subscriber module 426 of the threat management facility 402, which may, for example, be the subscriber 318 described above with reference to FIG. 3, may facilitate connections with endpoints and support detection of clone candidate endpoints, e.g., by maintaining an endpoint connection directory 420. In example embodiments, the subscriber module 426 may be embodied as a plurality of logical and/or physical modules that maintain persistent connections between endpoints (such as EP-1 or EP-2 in FIG. 4, or more generally, any of the endpoints described herein) and the threat management facility 402. The endpoint directory 420 may be a storage facility that is accessible to and/or configured by the threat management facility 402. The endpoint directory 420 may be configured and maintained with information that facilitates differentiating among a plurality of directory records representing connections between endpoints and the threat management facility 402, and may be maintained, for example, with the legacy services of the threat management facility 402, e.g., by the legacy server 450 and security resources 444. In an embodiment, the endpoint directory 420 may include a plurality of records, each of which may describe a connection to the threat management facility 402 including: (i) a connection/endpoint session identifier (e.g., EP-1); (ii) an endpoint identifier of the connection (e.g., X); and (iii) a use status indicator to indicate the clone status of an endpoint (e.g., whether multiple endpoints are using a single endpoint identifier). The use status indicator may, for example be yes ("Y") when a clone is detected, no ("N") when no clone is detected, or TBD when duplicate usage has not yet been evaluated for an identifier, or is otherwise currently unknown.

An endpoint EP-1, which may be any of the endpoints described herein including physical, logical, virtual, and other types of endpoints, may initiate a connection request 404 to a managed network, such as an enterprise network managed by the threat management facility 402, over a first channel to the push server 460 having a first channel identifier. For purposes of illustration, the channels for each endpoint are not separately illustrated, but it will be understood that each connection to the threat management facility 402 may initially be made through a different channel to the threat management facility 402 (e.g., to the push server 312 of FIG. 3), and each such channel may receive a unique session identifier or channel identifier to facilitate separate tracking of connections by the threat management facility 402. The connection request 404 may contain, or include a reference to, an endpoint identifier by which the endpoint and a resulting connection are to be identified. The subscriber 426 may receive information indicative of the connection request 404 including the endpoint identifier X. When a connection is successfully established with the push server or other network component(s) of the threat management facility 402, the subscriber 426 may update the endpoint directory 420 (or cause the security resources 444 to update the endpoint directory 420) to associate a session managed by the threat management facility 402 for the endpoint EP-1 with the endpoint identifier X ("SESSION EP-1 ID=X," as illustrated in the figure). The threat management facility may also optionally determine whether the endpoint identifier X associated with the connection request 404 is already in use by another connection managed by the threat management facility 402, in order to facilitate threshold discovery of cloned endpoints. Where there is no indication that the endpoint EP-1 is a clone, this information may be stored in a record 424 for the first connection request 404 as corresponding clone status information (e.g., as "CLONE=N").

A second endpoint EP-2 may initiate a second connection request 406 to the threat management facility 402 on a second channel to the push server 460 with a second channel identifier. In those cases where both endpoints have a common identifier (X), e.g., the first endpoint EP-1 and the second endpoint EP-2 were instantiated from a single endpoint image, the second connection request 406 may include the same endpoint identifier X that was contained in the first connection request 404.

The subscriber 426 (of the push server 312) may determine if the new connection request 406 is from a potential clone, e.g., by comparing the endpoint identifier X in the second connection request 406 to other endpoint identifiers stored in the endpoint directory 420. The subscriber 426 may then notify the security resources 444 of the threat management facility 402, hosted on the legacy server 313, of the clone(s), and/or may request/initiate remediation by the security resources 444. In the example above, there is already a record 424 in the endpoint directory 420, and this contains an endpoint identifier X, which is the same as the endpoint identifier X contained in the second connection request 406. In response to successfully establishing a second push server connection with the push server of the threat management facility 402, and in response to detecting the same endpoint identifier X for the second endpoint EP-2 on the second channel, the endpoint directory 420 may be updated (e.g., by the subscriber 426) to reflect this conflict in endpoint identifiers. For example, the records 428 in the endpoint directory 420 may be updated to indicate two sessions with the same endpoint identifier X, and may also be updated with corresponding clone status information for each of the endpoints EP-1, EP-2, e.g., "CLONE=TBD"). More generally, a clone candidate endpoint may be identified through analysis of records in the endpoint directory 420 using any of a variety of techniques. For example, clone detection may be performed, e.g., as a background process run against the endpoint directory 420 on a predetermined schedule by the security resources 444. In another aspect, clone detection may be performed by the subscriber 426 upon receipt of an incoming connection request, where endpoint identifier information may be extracted from the incoming request and used to perform a lookup in the endpoint directory 420 for other endpoints using the same endpoint identifier. Regardless of where the endpoint directory 420 is stored, and regardless of the manner in which the duplicate detection is performed, the system 400 may respond to the detection of one or more cloned endpoints by initiating remedial action.

In one aspect, the threat management facility 402 may, based on the detection of clone candidate endpoints, initiate a test to identify and resolve potentially cloned endpoints. For example, an identification challenge module 432 may issue an identification challenge to endpoints that have been identified (based on data in the endpoint directory 420) as using a common endpoint identifier. In one aspect, the identification challenge module 432 may be integrated with and/or operated by the subscriber module 426. The identification challenge module 432 may also or instead be a separate module of the threat management facility 402 that cooperates with the subscriber 426 and/or other components of the push server 460 (or other network infrastructure) to resolve clone detection issues. In another aspect, the identification challenge module 432 may initiate challenges on a time-limited basis, e.g., by issuing a challenge only when a particular endpoint identifier has not been challenged within some predetermined window defined in, e.g., seconds or minutes. This can mitigate unnecessary re-challenges in cases of brief, intermittent connectivity dropouts for recently verified endpoints.

Continuing the above example, where two endpoints are identified as clones based on the shared endpoint identifier X, the identification challenge module 432 may be configured to present an identification challenge configured to solicit unique responses from unique endpoints. For example, a first identification challenge 408 may be transmitted to the first endpoint EP-1, and the second identification challenge 410 may be transmitted to the second endpoint EP-2. These identification challenges 408, 410 may, for example, each be assigned an identification challenge instance identifier that may be communicated by the identification challenge module 436 to, for example, the security resources 444 for use when processing end point challenge responses. These identification challenges 408, 410 may, for example, each include a challenge identifier (which may be endpoint identifier X), a time stamp, and so forth. In another aspect, the identification challenge may refer to, e.g., other contextual or stored information that might be used to uniquely identify endpoints, such as a channel identifier, session identifier or other unique identifier of the communication channel between the push server and one of the endpoints. Each endpoint that receives an identification challenge may be configured, e.g., by a local security agent or other local resource, to generate a response to the challenge based on local data for the endpoint. This may, for example, include generating a response based on any suitable signatures, hashes, fingerprints, random strings, and/or other digital content or the like that can be used to disambiguate endpoints. One example of such features is a randomized data value produced by the responding endpoint. Optionally, the randomized data value may include and/or be based at least in part on data contained in the identification challenge such as the challenge instance identifier, channel identifier, time stamp, and so forth. In this way, the identification challenge module 432 can cause each responding endpoint to generate a response based on different seed data, which should result in different responses that can be used to distinguish among endpoints.

Each endpoint receiving an identification challenge may responsively generate and transmit a challenge response to the threat management facility 402. Where the analysis of potential clones is performed by the security resources 444 of the threat management facility, the challenge responses may be sent directly to an ingest service of the legacy server 450. In an example, the first endpoint EP-1 may generate and transmit a first challenge response 412 containing a first response code AAA ("EP CODE=AAA"), which may be generated using any of the techniques described herein and transmitted to the endpoint balancer 442 or other network resources of the legacy server 450. The second endpoint EP-2 may generate and transmit a second challenge response 414 containing a second response code BBB ("EP CODE=BBB"), which may also be generated using any of the techniques described herein, and may be transmitted to the legacy server 450. These challenge responses 412, 414 may be received, e.g., by the endpoint balancer 442 or other network component(s) associated with the threat management facility 402, which may analyze the challenge responses 412, 414 and initiate suitable responsive actions. For example, in the case where one or fewer responses with unique response codes are detected, the security resources 444 may update the records in the endpoint directory 420 to indicate that only one (or zero) endpoint(s) is currently using the candidate duplicate endpoint identifier and therefore the endpoint identifier is not cloned. However, if the security resources 444 detect two or more challenge responses for the same with unique response codes, a corresponding number of records 435 in the endpoint directory 420 may be modified to reflect the presence of cloned endpoints ("CLONE=Y").

The threat management facility 402 (e.g., via the security resources 444) may impose a challenge response timeout limit (e.g., based on a timestamp associated with and/or included in the identification challenge). When a challenged endpoint does not respond within the response timeout limit, a challenge timeout workflow may be activated. In an example of a first challenge timeout workflow, the challenged endpoint may be deemed to be no longer connected to the network. In this case, the corresponding session entry in the endpoint directory 420 may be removed or otherwise marked to indicate the entry is no longer associated with an active endpoint. In this example, when a response to an identification challenge is received after a response timeout limit, the response may be discarded without initiating a suitable response action. In an alternate example of a challenge timeout workflow, a corresponding session entry for a non-responding endpoint may be left unchanged for an initial identification challenge of the non-responding endpoint. In this example, if the non-responding endpoint fails to respond to an identification challenge during a subsequent identification challenge, the corresponding session entry for the non-responding endpoint in the endpoint directory 420 may be removed and/or invalidated. However, if a response to the initial identification challenge is received after the response time out (and before a subsequent identification challenge), suitable remediation action may initiated.

When two or more endpoints are detected responding to the same instance of identification challenge, the threat management facility 402 may notify the publisher 436 or some other component of the push server 460, which may in turn issue a "clone detected" command to each responding endpoint (endpoints EP-1 and EP-2 in the exemplary embodiment depicted in FIG. 4) on its corresponding channel indicating that the endpoint is using a cloned endpoint identifier, or otherwise notifying the endpoint of the clone status detected by the threat management facility 402. The receipt of this command at an endpoint may cause the endpoint, or a local security agent executing on the endpoint, to initiate a cloned endpoint workflow in which the endpoint increases a rate of command poll to the (legacy server 450) of the threat management facility 402. This approach advantageously permits endpoints to reduce network traffic and latency by using a long polling interval to the threat management facility 402 as a default policy (e.g., one hour or more), while switching to a shorter polling interval (e.g., a few minutes or less) when conditions such as duplicate endpoint identifiers indicate that reregistration may be appropriate for one or more endpoints in the enterprise network.

In the cloned endpoint workflow, the endpoint EP-1 may increase the command polling rate to the security resources 444 of the threat management facility 402, beginning with an initial command poll 470 at the increased polling rate associated with the cloned endpoint workflow. In response to the command poll 470, which may be an HTTP GET command or the like, the threat management facility 402 may identify the status of the endpoint EP-1 as a clone (based on the record 435, "CLONE=Y") in the endpoint directory 420) and orchestrate an endpoint re-registration 416 with the endpoint EP-1 using a new endpoint identifier Y ("ID=Y"). The endpoint directory 420 may then be updated with a record 435 indicating the non-clone status of the re-registered endpoint ("SESSION EP-1 ID=Y CLONE=N"). Similarly, the endpoint EP-2 may increase the command polling rate to the security resources 444 of the threat management facility 402, beginning with an initial command poll 472 at the increased polling rate associated with the cloned endpoint workflow. In response to the command poll 472, which may be an HTTP GET command or the like, the threat management facility 402 may identify the status of the endpoint EP-2 as a clone (based on the record 435, "CLONE=Y", or if the second endpoint EP-2 issues a command poll after reregistration of the first endpoint EP-1, based on the updated record 438 in the endpoint directory 420), and orchestrate an endpoint re-registration 418 with the endpoint EP-2 using a new endpoint identifier Z ("ID=Z"). The endpoint directory 420 may then be updated with a record 440 indicating the non-clone status of the re-registered endpoint ("SESSION EP-2 ID=Z CLONE=N").

After completion of a re-registration of the first endpoint EP-1 with an endpoint identifier Y, the endpoint EP-1 may resume polling at a default or base rate, e.g., at a polling rate specified by the threat management facility 402 as a default policy for the enterprise network, e.g., a rate slower than the command poll rate during the cloned endpoint workflow. Similarly, after completion of a re-registration of the second endpoint EP-2 with an endpoint identifier Z, the endpoint EP-2 may resume polling at a default or base rate, e.g., at a polling rate specified by the threat management facility 402 as a default policy for the enterprise network, e.g., a rate slower than the command poll rate during the cloned endpoint workflow.

It will be understood that, while illustrated for two endpoints, this process may be expanded and/or repeated as necessary for any number of endpoints in an enterprise network that connect to the enterprise network using a common endpoint identifier. This may be particularly useful, e.g., in a virtual computing environment where multiple endpoints are instantiated from a single endpoint image, or where endpoints otherwise disconnect and reconnect in a manner that causes stale endpoint records in the endpoint directory 420 maintained by the threat management facility 402.

Figure 5:
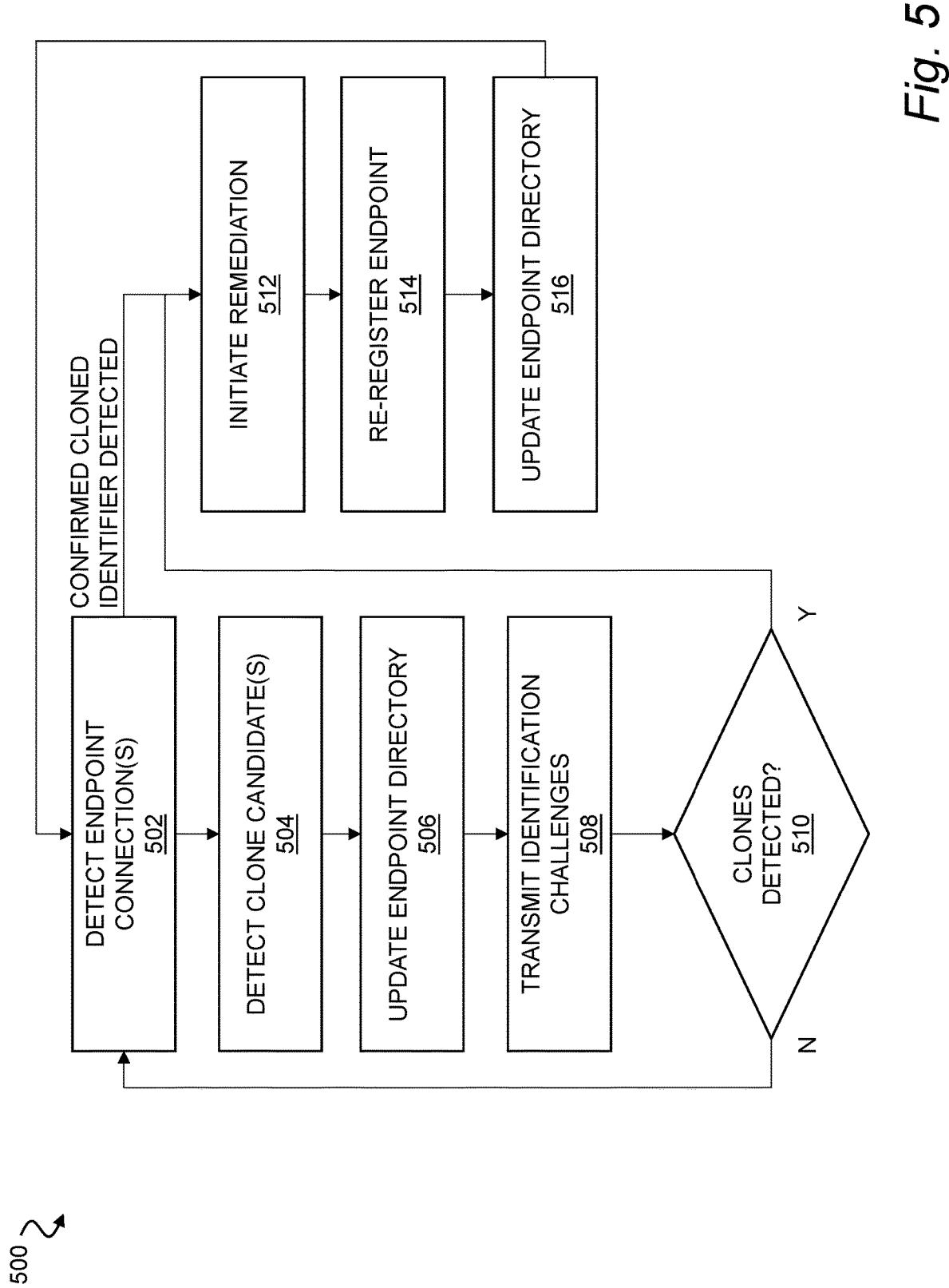
FIG. 5 illustrates a flow chart of a method for detecting and remediating duplicate endpoint identifiers.

FIG. 5 illustrates a flow chart of a method for detecting and remediating duplicate endpoint identifiers.

As shown in step 502, the method 500 may include detecting one or more connections, e.g., with a network management resource such as any of the threat management facilities described herein. The connections may include a first connection to the threat management facility for the enterprise network, which connection may include an endpoint identifier associated with an endpoint initiating the connection to the network management resource. For example, the threat management facility may provide security services to an enterprise associated with the endpoint, and the endpoint may connect to the threat management facility to facilitate provisioning of security resources hosted by the threat management facility. In general, any number of additional connections may be detected. Each connection may be evaluated against a current list of endpoint identifiers that are confirmed as cloned endpoint identifiers (e.g., based on an identification challenge described herein). If the endpoint identifier included in the first connection matches an entry in this list, the method may initiate remediation as shown in step 512.

Evaluating a new connection against a current list of confirmed cloned endpoint identifiers may also be adapted based on connection-related timers. In example embodiments, when an endpoint with ID "x" connects to the network, e.g., to the push server or other network management resources, a clone check timer may be started. On expiry of the clone check timer, a check may be performed to determine if ID "x" has already been marked as a clone. In example embodiments, this check may include reading from a local connection data store, such as the push server datastore 320 that may include a clone status for each connection entry. If ID "x" has not already been marked as a clone, clone candidate detection may be performed as shown in step 504.

As shown in step 504, one or more clone candidates may be detected. For example, it may be determined that the endpoint identifier included in the first connection is associated with a plurality of different connections to the threat management facility that are not yet identified as being based on a cloned endpoint identifier.

In one aspect, this detection may be performed, e.g., using an endpoint directory or other database of connections to the threat management facility, which may be maintained by the threat management facility or a related service or resource. Each record in the endpoint directory may store information about a connection, such as an endpoint identifier, a session or channel identifier for the connection, a clone status of an associated endpoint, and so forth, any of which may be useful for detecting and remediating cloned endpoints in the enterprise network. If the endpoint identifier included in the first connection has an endpoint identifier that matches or substantially matches one or more other records in the endpoint directory, it may be determined that the endpoint identifier is associated with a plurality of connections to the threat management facility, and the clone status of a corresponding endpoint identifier and/or session in the endpoint directory may be updated to reflect this candidate clone status.

In another one aspect, the clone candidate detection may initially be performed by a push server or other network component independent from, but connected to, the threat management facility based on, e.g., a short term cache maintained by the push server. In another aspect, clone candidate detection may be performed by requesting, with the push server, a lookup to a persistent endpoint directory maintained by the threat management facility.

As shown in step 506, an endpoint directory of connections to the threat management facility may be updated, e.g., to indicate that the endpoint identifier included in the first connection is a candidate duplicate endpoint identifier (also referred to herein as a cloned endpoint identifier). Updating the endpoint directory may include updating other records that are associated with the endpoint identifier, such as to indicate that at least one other connection is configured with the same endpoint identifier. The endpoint directory of connections may be updated by the threat management facility or other network management resources described herein. This permits subsequent lookups when new connections are initiated by endpoints in the enterprise network.

As shown in step 508, the method 500 may include transmitting identification challenges to endpoints in the enterprise network. For example, an identification challenge may be transmitted over each of the plurality of connections in the endpoint directory that is associated with the endpoint identifier identified as a clone candidate. The identification challenge may be configured with data and/or instructions to solicit a response from an endpoint associated with each of the plurality of connections, e.g., such as any of the response described herein. For example, each endpoint that receives this identification challenge may generate a response that includes features such as randomized data, and transmit the response in a message to the threat management facility to assist in determining if more than one endpoint is currently using a particular endpoint identifier. One example of such features includes a randomized data value produced by the responding endpoint. Optionally, the randomized data value may include and/or be based at least in part on an identification challenge instance identifier (e.g., a date, a time, a random value transmitted to the endpoint with the challenge, and so forth). In this way, each instance of identification challenge may be distinguished for each responding endpoint.

In one aspect, the challenge may be initiated by the push server, e.g., by an identification challenge module or the like of the push server in response to detecting the presence of a clone using locally cached endpoint data. In another aspect, the challenge may be initiated by the threat management facility, which may receive connection data from the push server, update the endpoint directory, and then detect cloned endpoints based on the updated endpoint directory. In this latter case, the threat management facility may nonetheless use the persistent connection provided by the push server to communicate the identification challenge to the clone candidates.

In an example, identification challenges may include an identification challenge activation timeout that requires a minimum amount of time between transmitting consecutive identification challenges. The timeout value may be adapted from a default timeout value based on an amount of time since a most recent prior identification challenge associated with an endpoint identifier for which clone detection is desired.

Identification of candidate cloned endpoint identifiers as shown in step 504 may be performed as new connections are established, by examining records in an endpoint connection directory, and the like. These actions may be performed asynchronously with performing identification challenges. To avoid activating a new identification challenge (e.g., caused by candidate cloned endpoint identifier actions shown in step 504) for an endpoint identifier for which an instance of identification challenge is already active, instance of identification challenges may also be tracked. This may involve configuring a time-limited record that, when checked, can hold off activation of a next identification challenge for a candidate cloned endpoint identifier. The time-limited record may automatically be removed when an active instance of identification challenge is complete.

Yet further an identification challenge may be configured to include a challenge instance identifier that may be established by the threat management facility or other network management resource tasked with initiating identification challenges. The instance identifier may be used for determining, when a response to an identification challenge is received, the instance to which the response is targeted. The instance identifier, which may be a data value based on a time/date of the instance, may be received by a targeted endpoint and relied upon when generating an identification challenge response. In an example, an endpoint responding to a first instance of an identification challenge may configure a response to the identification challenge that may include a response data value (e.g., random or the like) that may be correlated to the challenge instance identifier. In this way, a response by the endpoint to a second instance of an identification challenge may be distinguished from a response by the endpoint to the first instance.

As shown in step 510, the method 500 may include evaluating responses to the identification challenges. If no clones are detected, e.g., where zero or one responses are received to an identification challenge, the endpoint directory may be updated to reflect this clone status for the corresponding connections, and the method 500 may return to step 502 where additional endpoint connections can be detected. If clones are detected, e.g., where more than one unique response is received to an identification challenge, then the method 500 may proceed to step 512 wherein clone remediation is initiated.

As shown in step 512, the method 500 may include initiating remediation of cloned endpoints. This may, for example, include transmitting a "clone detected" message or the like to endpoints associated with the cloned identifier so that they can initiate a cloned endpoint workflow to address the duplicate identifiers in the enterprise network. In one aspect, this may include a message containing an alert, flag, or the like concerning clone detection, which may cause responsive action by local security agents receiving the "clone detected" message on the duplicate endpoints. More specifically, the "clone detected" message may cause local security agents to increase a command polling frequency to the threat management facility, e.g., from a longer polling interval (e.g., of an hour or more) specified by a default enterprise policy, to a shorter polling interval (e.g., of a few minutes or less) specified for known endpoint clones. As a significant advantage, this causes endpoints that are known to be clones to quickly issue a poll command to the threat management facility, which will in turn cause the known clone to reregister to the threat management facility with a new and unique endpoint identifier. In another aspect, the "clone detected" message may be in the form of an explicit request to increase the command polling frequency by endpoint recipients. In one aspect, the increased polling frequency may terminate after some predetermined time period. In another aspect, reregistering endpoints may revert, upon re-registration, to the default polling interval for the enterprise.

In one aspect, an endpoint may respond to a "cloned detected" message by initiating, e.g., with a local security agent executing on the endpoint, a cloned endpoint workflow that includes increasing a command polling rate, e.g., from a default rate of more than once per hour to a remedial rate of at least once every few minutes, once per minute, or more than once per minute. This may advantageously improve the likelihood that a network management resource (e.g., the threat management facility) will quickly detect a command poll from an endpoint that is using a cloned endpoint identifier and take appropriate remedial action.

As shown in step 514, in response to a command poll from a known clone (which may be determined by the threat management facility based on the endpoint directory), the threat management facility may remediate a cloned endpoint by orchestrating a re-registration process with the endpoint. In one aspect, during the re-registration process the threat management facility may provide an endpoint identifier that is different than the cloned endpoint identifier being used by multiple endpoints, and more generally, unique in the enterprise network (e.g., different than other endpoint identifiers in the endpoint directory). The endpoint identifier assigned may further be based at least in part on one or more aspects of the identification challenge response, such as based on a portion of the randomized data value produced by the responding endpoint, and the like, in order to facilitate uniqueness among endpoints.

In one aspect, endpoint re-registration may be orchestrated across a managed network, such as an enterprise network managed by the threat management facility, in a manner that balances demand for re-registration with negative impact on network bandwidth, network management resource loading, and the like. Thus, re-registration may be subject to a re-registration throttling policy that may be controlled by a throttling function in order to ensure that the rate of re-registration does not meet a predetermined threshold. In an example, instructing a plurality of endpoints that are identified as using cloned endpoint identifiers to re-register may be limited, e.g., by spacing out the re-registration requests over time, based on such a throttling policy that limits re-registration activity according to the ratio of re-registrations to total connections to the threat management facility, a percentage of re-registrations to the total number of connections to the threat management facility, the current number of connections that are identified as using cloned endpoint identifiers, and the like.

As shown in step 516 the endpoint directory may be updated based on a result of re-registration performed in association with step 514. This may result in a record for one of the multiple connections using the cloned endpoint identifier being updated to reflect the unique endpoint identifier configured during re-registration, and updated by changing a clone status from "CLONE=Y" to "CLONE=N." Upon updating the endpoint directory for the re-registered endpoint, the method 500 may return to step 502 where new endpoint connections can be detected.

In addition to storing data for endpoints that respond to the identification challenge, records in the endpoint directory may also be maintained for connections with endpoints that do not respond to an identification challenge.

Other updating of the endpoint directory may also or instead be periodically performed. For example, maintaining the endpoint directory may include taking one or more endpoint directory maintenance actions based on a result of an identification challenge, such as removing records in endpoint directory that correspond to connections for which a response to the identification challenge was not received. In one aspect, maintaining the endpoint directory may include configuring a countdown timer or expiration time for removing one or more records for which a response was not received, so that corresponding records can automatically be removed from the endpoint directory after a predetermined period of inactivity. Maintaining the endpoint directory may also or instead include marking expired records in the endpoint directory as obsolete. Timers may further be configured for other endpoint directory maintenance activities associated with candidate or confirmed cloned endpoint identifiers. For example, a disconnect-all timer may be configured based on a detection of use of an endpoint identifier by a plurality of endpoints, upon expiration of which the system may force the multiple connections for the plurality of endpoint to disconnect from the system. This action may include updating the endpoint directory to indicate that these multiple connections are no longer actively communicating with the threat management system. The system may take this action for all connections using a single endpoint identifier independent of response to an identification challenge. The system may also or instead take this action for connections that respond to an identification challenge. As described herein, the general objective is to force endpoints using the network with a cloned endpoint identifier to reconnect quickly (with an accelerated command polling schedule) and re-register to receive a unique endpoint identifier in the enterprise network. To this end, the techniques described herein may be used to expire stale records from the endpoint directory. Subsequently, endpoints that reconnect to the network using the previously cloned endpoint identifier can be matched to corresponding new records in the connection/endpoint directory, or, to the extent possible, to an existing record based on, e.g., a session identifier, channel identifier, or the like.

According to the foregoing, described herein is a method for detecting and remediating duplicate endpoint identifiers that includes detecting a first connection to a threat management facility for an enterprise network. The first connection may include an endpoint identifier. The endpoint identifier may be associated with an endpoint requesting the first connection. The method may include determining that the endpoint identifier is associated with a plurality of connections to the threat management facility, thereby suggesting that the endpoint using the endpoint identifier has been cloned. The method may further include transmitting an identification challenge over each of the plurality of connections associated with the endpoint identifier. In general the identification challenge may be transmitted to each endpoint that is using the shared endpoint identifier, independent of which connection each endpoint uses to access resources on the network. Each endpoint that is connected to the network through one of the plurality of connections may be configured to provide a response to an identification challenge that is unique for at least a combination of the endpoint and an instance of the challenge. In response to receiving two or more different challenge responses, a command may be transmitted over a corresponding connection for each of the two or more different challenge responses to increase a frequency of command polls to the threat management facility. The command may cause each endpoint generating the challenge responses to increase its command poll frequency. Transmitting the command may include signaling to each endpoint from which a unique identification challenge response was received that it is a cloned endpoint. In response to a command poll received over one of the plurality of connections, an endpoint associated with the one of the plurality of connections may be requested to reregister to the threat management facility. A result of reregistering may include assigning a unique endpoint identifier to the one of the plurality of connections.

In embodiments, in response to receiving a request for a subsequent connection including the endpoint identifier at a network management resource, the command to increase a frequency of command polls may be transmitted over the subsequent connection. This may occur as part of and/or contemporaneously with responding to the subsequent connection request independent of conducting an identification challenge over the subsequent connection. In example embodiments, this subsequent command to increase frequency of command polls may alternatively be a notification to the endpoint of the subsequent connection that it is using a cloned endpoint identifier. An endpoint communicating with the network over the subsequent connection may respond to either command by increasing a frequency of command polls, which may include command polls to the threat management facility.

In embodiments, in response to receiving a subsequent connection including the endpoint identifier, the method may include orchestrating an endpoint re-registration process for the subsequent connection including sending a re-registration command or request to an endpoint associated with the subsequent connection. The network management resource orchestrating the re-registration process may facilitate assigning a unique endpoint identifier for use by the endpoint associated with the subsequent connection.

Determining that the endpoint identifier is associated with a plurality of connections may be based on an endpoint directory that associates endpoint identifiers with connections to the threat management facility and/or to another network management resource. The endpoint directory may be updated by taking one or more endpoint directory maintenance actions based on, for example, a result of an identification challenge. Endpoint directory maintenance actions may include: removing records in endpoint directory that correspond to connections for which a response to the identification challenge was not received; configuring a countdown timer for removing one or more such records; marking records with records in endpoint directory as obsolete, and the like.

Endpoint re-registration may be orchestrated across a managed network, such as an enterprise network managed by the threat management facility, in order to balance demand for re-registration with negative impact on network bandwidth, network management resource loading, and the like. Re-registration may be subject to a re-registration throttling policy that may be controlled by a throttling function. In an example, instructions to a plurality of endpoints that are identified as using cloned endpoint identifiers to re-register may be throttled based on such a throttling policy that limits re-registration activity based on, e.g., a ratio of cloned endpoint connections to all connections, a percentage of the total connections that are associated with duplicate/cloned endpoints, or a number of cloned endpoint records in the endpoint directory.

Transmitting an identification challenge, such as to determine if an endpoint identifier is in use by more than one endpoint (a cloned endpoint identifier), may be based on context, such as a history of identification challenges associated with the network, the threat management facility, the particular endpoint identifier, and the like. In an example, an identification challenge timeout may be provided that establishes a minimum amount of time between transmitting identification challenges to an endpoint. The timeout value may be based on an amount of time since a most recent prior identification challenge associated with an endpoint identifier for which clone detection is desired.

The rate or quantity of identification challenges may also be adapted based on connection-related timers. In example embodiments, when an endpoint with ID "x" connects to the network (e.g., to the push server or other network management resources), a clone check timer is started. On expiry of the clone check timer, a check is performed to determine if ID "x" has already been marked as a clone. In example embodiments, this check may include reading from a connection data store, such as the data store locally cached by the push server. If ID "x" has not already been marked as a clone, the network management resources may check if there are two or more endpoints with ID "x" connected to the network (e.g., such as by checking a shared channel for that endpoint ID or by requesting data from the endpoint directory). If two or more instances of the endpoint identifier are detected, the cloned endpoint workflow may be initiated.

In example embodiments, a connection timer is started on each subsequent connection for an endpoint that uses a cloned endpoint identifier. As connections may occur at any time, including concurrently, it is possible that two connection timers could expire within a very short time of each other. In an attempt to avoid performing overlapping or conflicting checks of a current status of an endpoint, once an identification challenge is initiated, a time limited record may be configured and stored that tracks the challenge in progress. This progress record gets automatically removed after a certain amount of time, which may be preconfigured and/or adjusted based on network loading, or the number of duplicate endpoints. Therefore, before initiating any further instances of an identification challenge with endpoints using a cloned endpoint identifier (e.g., ID "x") due to a corresponding connection timer expiring, the system may check if a time limited record for endpoint identifier ID "x" exists. If it does exist, an identification challenge for the endpoint of the expired connection timer is in progress. This way, a second overlapping identification challenge for a single endpoint identifier can be avoided. Coordinating use of the connection timers and cloned endpoint workflow status time limited records may permit coordinated timing of when identification challenges are initiated, e.g., to prevent initiating the identification challenges too frequently. In example embodiments, multiple endpoints with ID "x" may all request connection at the start of a workday, (e.g., within 1-2 minutes of 9 AM on a Monday morning). The coordinated use described above can mitigate congestion and potential errors associated with the spike in demand for deduplication.

Yet further an identification challenge may be configured to include a challenge instance identifier that may be established by the threat management facility or other network management resource tasked with initiating identification challenges. The instance identifier may be used for determining, when a response to an identification challenge is received, the instance to which the response is targeted. The instance identifier, which may be a data value based on a time/date of the instance, may be received by a targeted endpoint and relied upon when generating an identification challenge response. In an example, an endpoint responding to a first instance of an identification challenge may configure a response to the identification challenge that may include a response data value (e.g., random or the like) that may be correlated to the challenge instance identifier. In this way, a response by the endpoint to a second instance of an identification challenge may be distinguished from a response by the endpoint to the first instance.

Methods and systems of detecting and remediating duplicate endpoint identifiers described herein may include operation of one or more network management resources, such as a connection manager, that handles requests from endpoints to connect to the network. A connection manager, or a subscriber and/or other push server components, may work cooperatively with a threat management facility in detecting and remediating cloned endpoint identifiers. The connection manager may be configured to access endpoint connection information to facilitate determining if a request for a connection includes a cloned endpoint identifier. The connection manager may be notified by other network management resources, such as a threat management facility, when a cloned endpoint identifier is suspected or confirmed (or not confirmed), and the like. In an example, the threat management facility may, in response to receiving two or more different identification challenge responses, notify a connection manager that an endpoint identifier has been cloned. The threat management facility and the connection manager may be configured to collaborate regarding early notification of cloned endpoint identifiers. In an example of such collaboration, a connection manager that has access to information indicative of cloned endpoint identifiers may, subsequent to receipt of a request for connection by an endpoint with a cloned endpoint identifier, notify the threat management facility of the requested cloned endpoint identifier connection. Early notification of a cloned endpoint identifier network connection may facilitate the threat management facility initiating cloned endpoint identifier remediation, such as by marking the connection as cloned independent of performing an identification challenge.

In an aspect, a method of operating an endpoint in an environment in which duplicate use of an endpoint identifier is remediated through one or more of the methods described herein may include the endpoint, responsive to connecting to a threat management facility of an enterprise network (optionally after a connection between the endpoint and a network is handled by a connection manager of the enterprise network), receiving an identification challenge on the enterprise network, such as by the threat management facility to which the endpoint establishes a connection. The endpoint may process the identification challenge and generate a challenge response including a data value that may include a random string and or other identifying indicia. In one aspect, the data value included in the response challenge may be a randomly generated challenge response string, and/or a response string that is correlated to the identification challenge, such as to an instance identifier of the identification challenge. The response to the identification challenge may include the randomly generated number incorporated with an identification challenge instance identifier.

Operating the endpoint may also include receiving a command from a network management resource (e.g., the threat management facility and the like) to adapt a rate of command polling based on a clone status on an endpoint. In one aspect, an increased rate of polling for commands from the threat management facility may be activated. The increase in rate of polling may be based on a base polling rate, a cloned endpoint identifier rate, a re-registration acceleration rate, and the like. As a non-limiting example, the endpoint may adjust a rate of command poling from once per hour to once per minute. When a command poll presents the cloned endpoint identifier to the threat management facility, one or more cloned endpoint identifier remediation actions may be initiated by the threat management facility. The endpoint may receive, in reply to this increased rate command poll, a request to re-register the endpoint with the threat management facility. The request to re-register the endpoint with the threat management facility may optionally be withheld from one or more command polls, e.g., to manage traffic rates or otherwise accommodate network or endpoint context. In this situation, the endpoint may receive commands other than a re-registration request.

In response to a re-registration request from the threat management facility, the endpoint may commence a re-registration process with the threat management facility. By undertaking this re-registration process the endpoint may receive a unique endpoint identifier to use in communications with the threat management facility and/or in an enterprise network managed by the threat management facility. Optionally, the re-registration process performed by the endpoint may take into consideration information prepared and provided in response to the identification challenge; therefore, an endpoint identifier received during the re-registration process may be based on one or more aspects of the identification challenge response.

The methods and systems described herein and depicted in the drawings filed herewith may include a method of management of endpoint with duplicate endpoint identifiers. Such an endpoint management method may include detecting use of a cloned endpoint identifier based on, e.g., a common identifier for multiple endpoints using a shared endpoint management channel through which endpoints are managed by a threat management facility. The shared endpoint management channel logically connects one or more endpoints that are identified by a single endpoint identifier with an endpoint management resource, such as a threat management facility. In example embodiments, a set of endpoints serviced through a shared endpoint management channel may each receive messages from the threat management facility delivered over the channel.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code that, when executing on one or more computing devices, performs any and/or all of the steps thereof. The code may be stored in a non-transitory computer readable memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of detecting and remediating duplicate endpoint identifiers, the method comprising:
    detecting a first connection to a threat management facility for an enterprise network, the first connection including an endpoint identifier associated with endpoint device configuration data for a virtual endpoint image used to create new endpoints for the enterprise network;
    determining that the endpoint identifier is associated with a plurality of connections to the threat management facility including at least the first connection and a second connection;
    transmitting an identification challenge over each of the plurality of connections associated with the endpoint identifier;
    in response to receiving two or more different challenge responses from devices using an endpoint identifier associated with endpoint device configuration data for a virtual endpoint image, transmitting a command over a corresponding connection for each of the two or more different challenge responses to increase a frequency of command polls to the threat management facility;
    in response to a command poll received over one of the plurality of connections, requesting an endpoint associated with the one of the plurality of connections to reregister to the threat management facility; and
    assigning a unique endpoint identifier to the one of the plurality of connections based on a corresponding one of the two or more different challenge responses.

2. The method of claim 1, further comprising, in response to receiving a subsequent connection including the endpoint identifier, orchestrating an endpoint re-registration process that causes configuration of an endpoint associated with the subsequent connection with a distinct endpoint identifier.

3. The method of claim 1, wherein determining that the endpoint identifier is associated with a plurality of connections is based on a directory that associates endpoint identifiers with connections to the threat management facility.

4. The method of claim 1, wherein in response to receiving two or more different challenge responses, the threat management facility updates one or more records in a directory of endpoint identifiers for the endpoint identifier that indicates the endpoint identifier is cloned.

5. The method of claim 1, wherein in response to receiving two or more different challenge responses, the threat management facility removes records in a directory of endpoint identifiers that correspond to connections for which a response to the identification challenge was not received.

6. The method of claim 1, wherein requesting the endpoint to reregister is based on a reregistration throttling function of the threat management facility that limits reregistration based on a percentage of connections to the threat management facility.

7. The method of claim 1, wherein requesting the endpoint to reregister is based on a reregistration throttling function of the threat management facility that limits reregistration based on a percentage of connections that share an endpoint identifier.

8. The method of claim 1, wherein transmitting the identification challenge is based on an identification challenge timeout.

9. The method of claim 8, wherein the identification challenge timeout is an amount of time since a most recent prior identification challenge associated with the endpoint identifier.

10. The method of claim 1, wherein the identification challenge for at least one of the plurality of connections includes a challenge instance identifier.

11. The method of claim 10, wherein one of the two or more different challenge responses corresponding to the at least one of the plurality of connections includes the challenge instance identifier and a random string correlated to the challenge instance identifier.

12. The method of claim 1, further comprising transmitting a second command to a plurality of computing resources in the enterprise network to treat each endpoint associated with the endpoint identifier as a cloned endpoint.

13. The method of claim 1, further comprising, in response to receiving two or more different challenge responses, notifying a connection manager facility of the enterprise network that the endpoint identifier has been cloned.

14. The method of claim 1, further comprising, in response to receiving two or more different challenge responses, configuring a connection manager of the enterprise network to notify the threat management facility in response to receiving a subsequent request for connection using the endpoint identifier.

15. A method for operating an endpoint comprising:
    connecting to a threat management facility of an enterprise network with a device identifier associated with endpoint device configuration data for a virtual endpoint image used to create new endpoints for the enterprise network;
    receiving an identification challenge from the threat management facility;
    transmitting a challenge response to the identification challenge, the challenge response including a random string;
    in response to transmitting the challenge response from the endpoint using the device identifier associated with endpoint device configuration data for a virtual endpoint image used to create new endpoints for the enterprise network, receiving a command from the threat management facility to increase polling for commands from the threat management facility;
    in response to the command to increase polling, sending a poll for a command to the threat management facility;
    receiving a request to reregister with the threat management facility; and
    reregistering with the threat management facility as a unique endpoint based on the response to the identification challenge.

16. The method of claim 15, further comprising, in response to the command to increase polling for commands, adjusting a frequency of polling for commands from a default command polling frequency to a cloned endpoint command polling frequency.

17. The method of claim 15, further comprising, in response to the identification challenge, randomly generating a challenge response string that is correlated to the identification challenge.

18. The method of claim 15, further comprising, in response to the identification challenge, generating a random number and incorporating the random number and an identification challenge identifier of the received identification challenge in the challenge response.

19. A method of management of endpoints with duplicate endpoint identifiers, the method comprising:
    detecting an indication of a cloned endpoint identifier at a threat management facility, the indication identifying a shared endpoint management channel based on an endpoint identifier associated with endpoint device configuration data for a virtual endpoint image used to create new endpoints for an enterprise network;

transmitting an endpoint identification challenge over the shared endpoint management channel associated with the cloned endpoint identifier;

in response to receiving two or more different responses to the endpoint identification challenge from cloned endpoints using the endpoint identifier associated with endpoint device configuration data for the virtual endpoint image, transmitting an instruction over the shared endpoint management channel causing each cloned endpoint to increase a frequency of command polls to the threat management facility;

notifying a plurality of network management resources to manage endpoints using the endpoint identifier as cloned endpoints; and in response to receiving an increased frequency command poll from a cloned endpoint, assigning a unique endpoint identifier to the cloned endpoint; and removing records in an endpoint directory associated with the cloned endpoint identifier for endpoints that did not respond to the endpoint identification challenge.

20. The method of claim 19, further comprising removing records in an endpoint directory associated with the cloned endpoint identifier for endpoints that did not respond to the endpoint identification challenge, in response to receiving the increased frequency command poll over a plurality of connections, requesting at least one endpoint associated with at least one of the plurality of connections to reregister to the threat management facility.

* * * * *